Oct. 24, 1939.   C. G. OLSON   2,176,924
GEAR GRINDING MACHINE
Original Filed Sept. 26, 1930   11 Sheets-Sheet 1
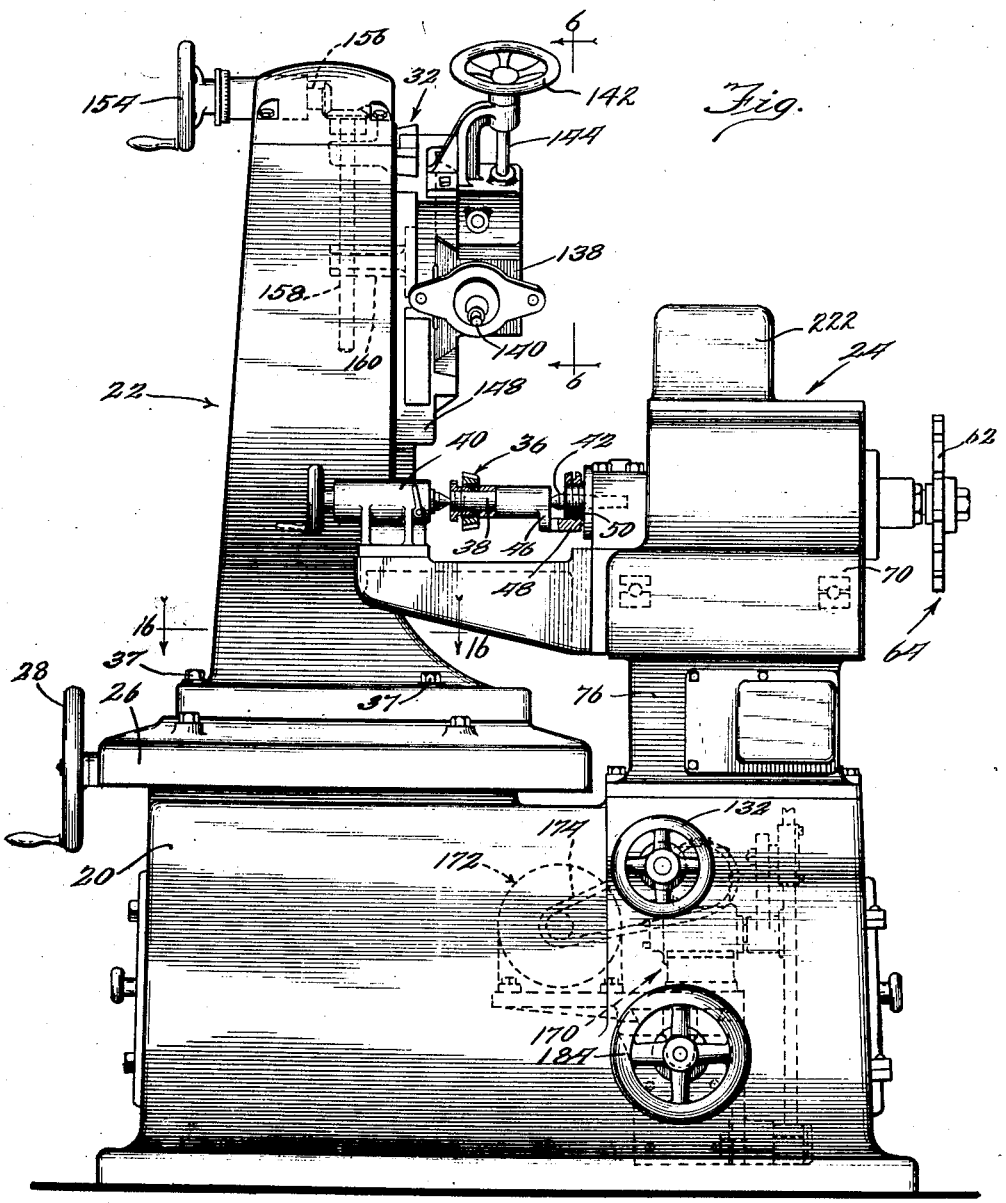
Fig.
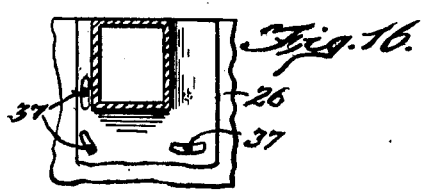
Fig. 16.
Inventor:
Carl G. Olson
By Cheever, Cox & Moore
Attys.

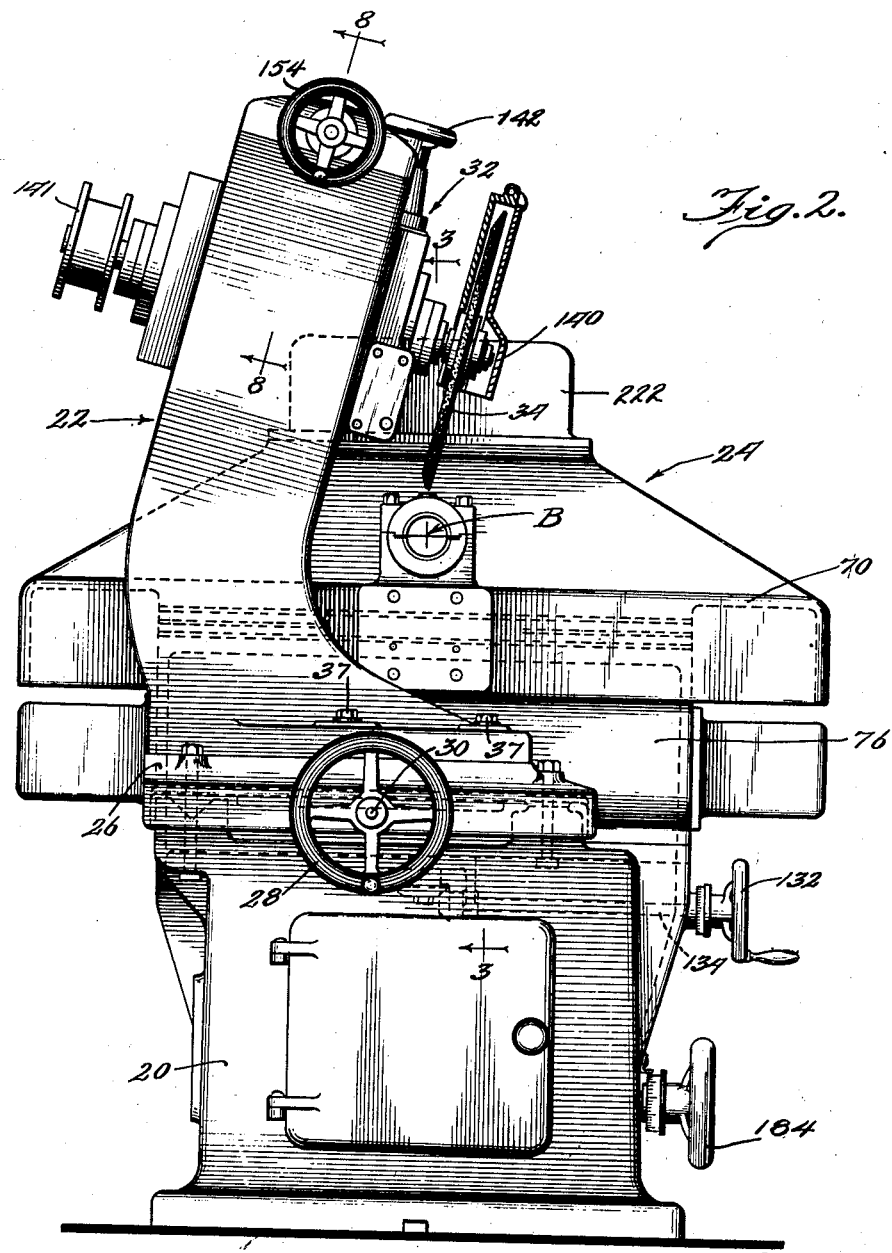

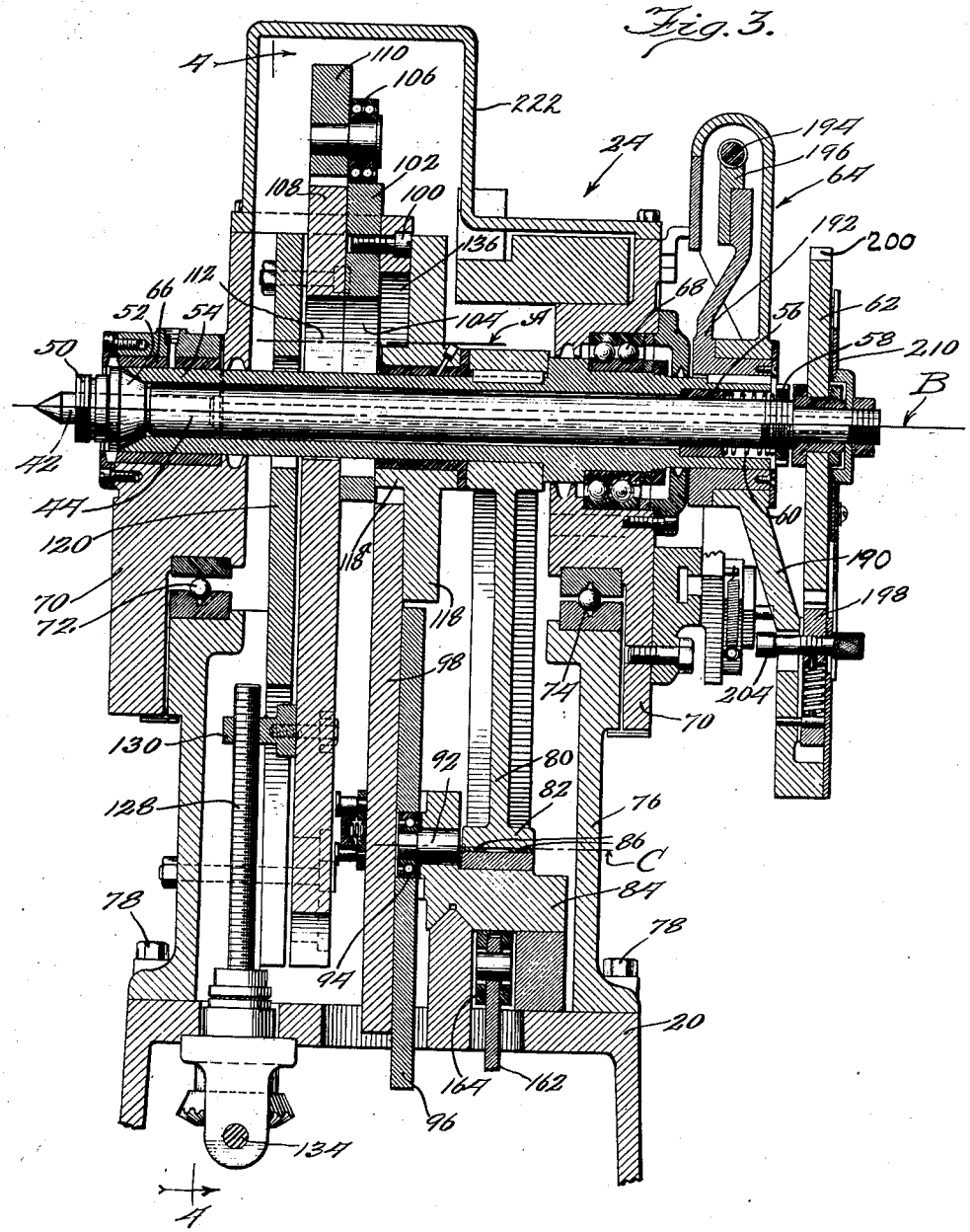

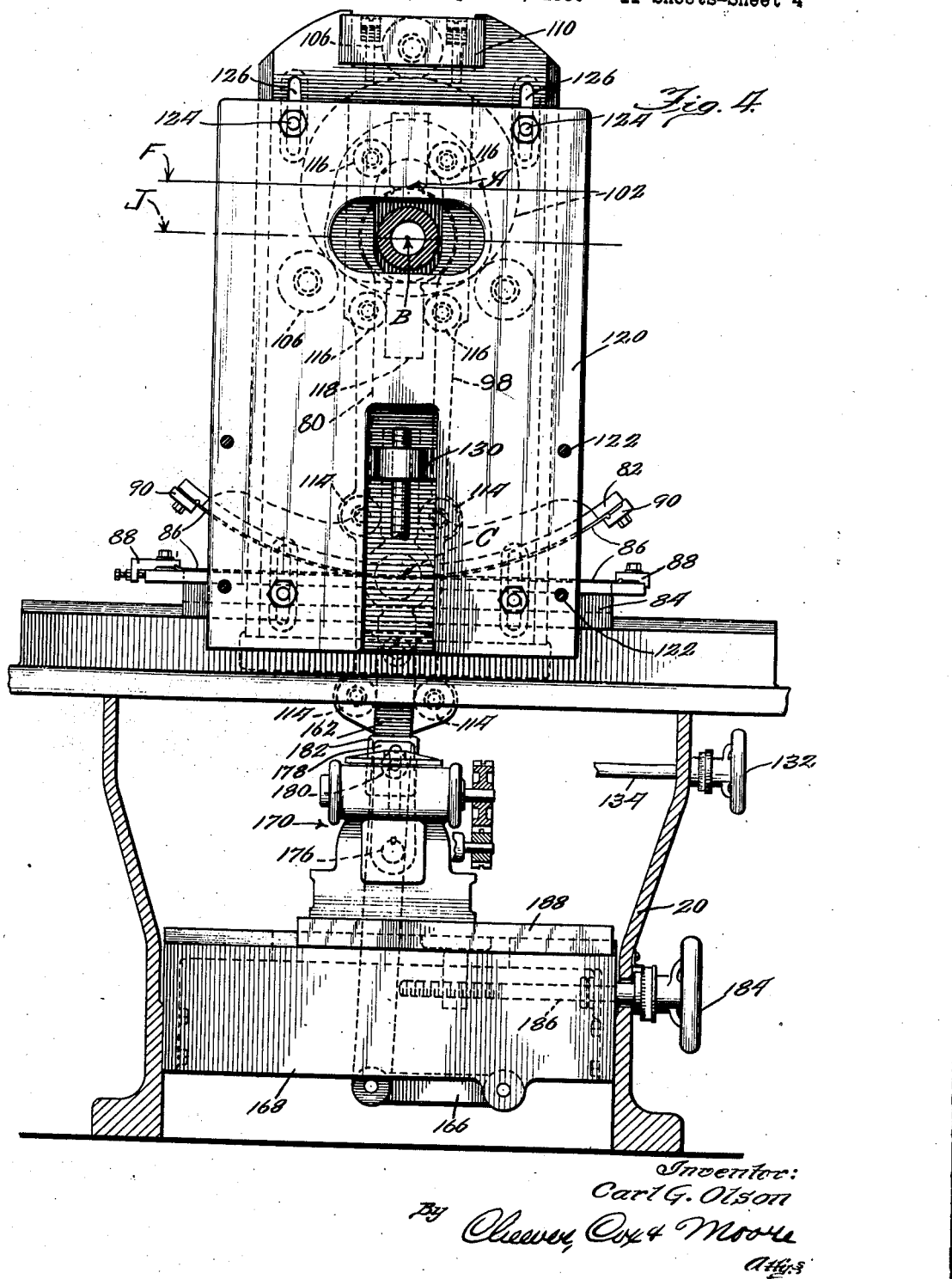

Oct. 24, 1939.   C. G. OLSON   2,176,924
GEAR GRINDING MACHINE
Original Filed Sept. 26, 1930   11 Sheets-Sheet 5

Inventor:
Carl G. Olson
By Cleaver, Cox & Moore
Attys.

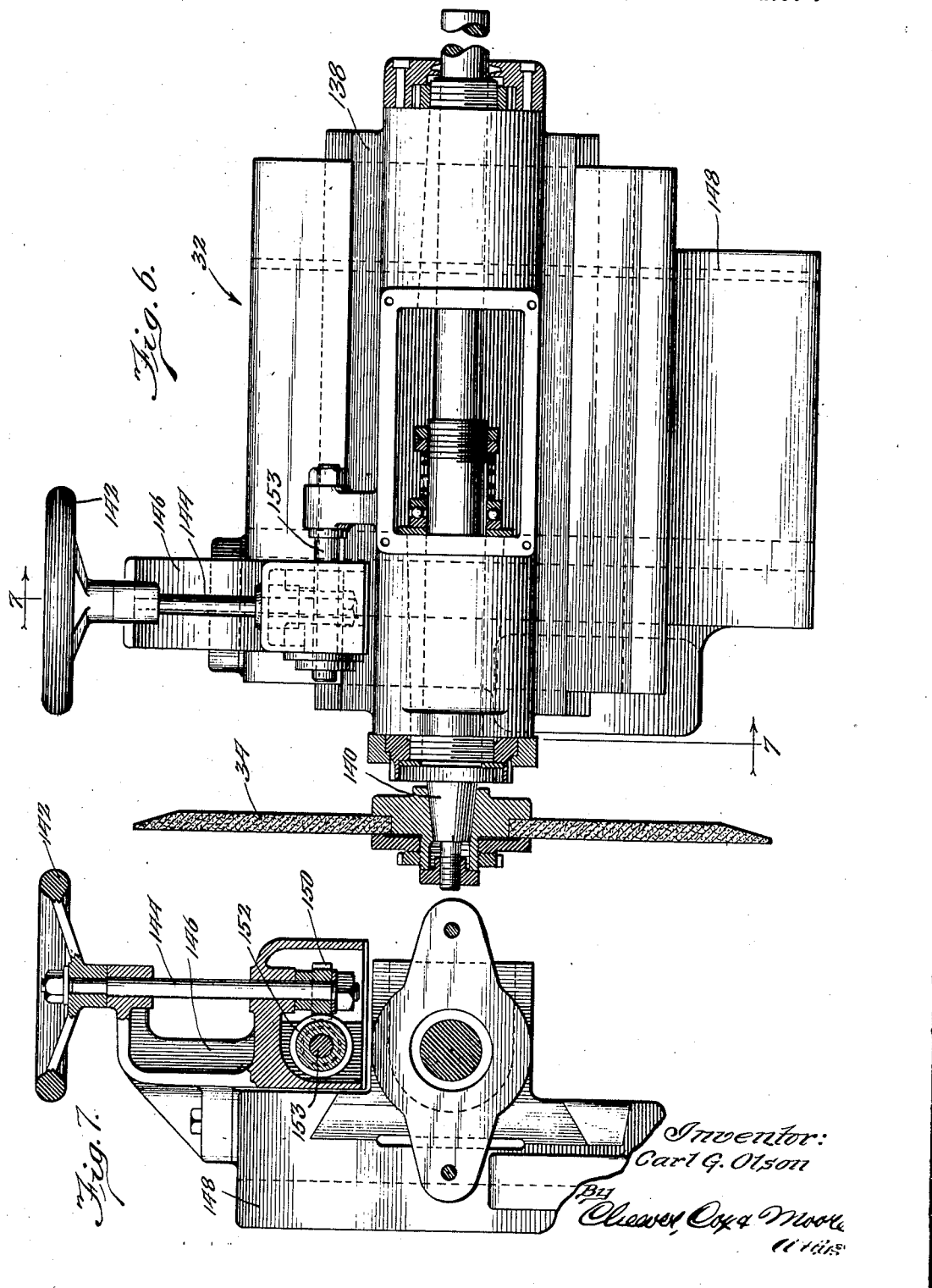

Oct. 24, 1939.    C. G. OLSON    2,176,924
GEAR GRINDING MACHINE
Original Filed Sept. 26, 1930    11 Sheets-Sheet 7
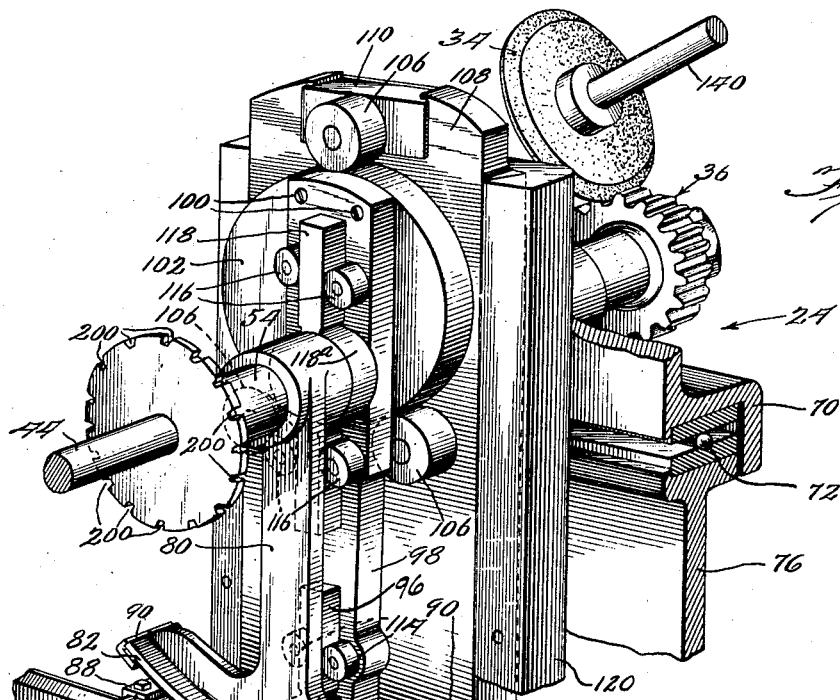
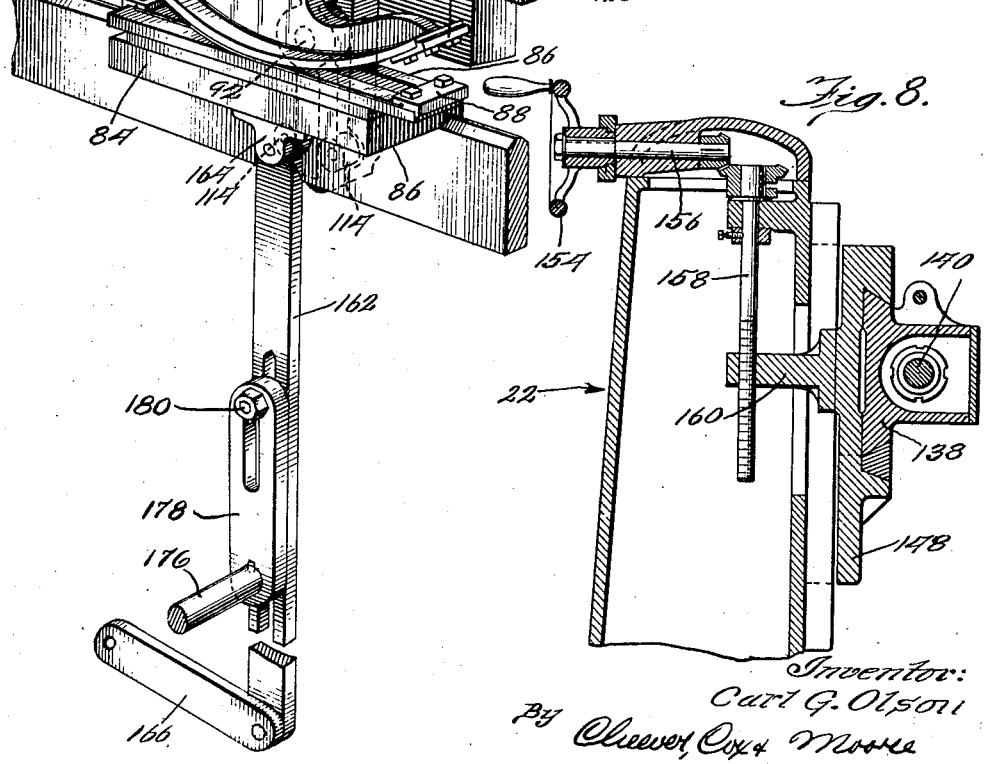
Inventor:
Carl G. Olson

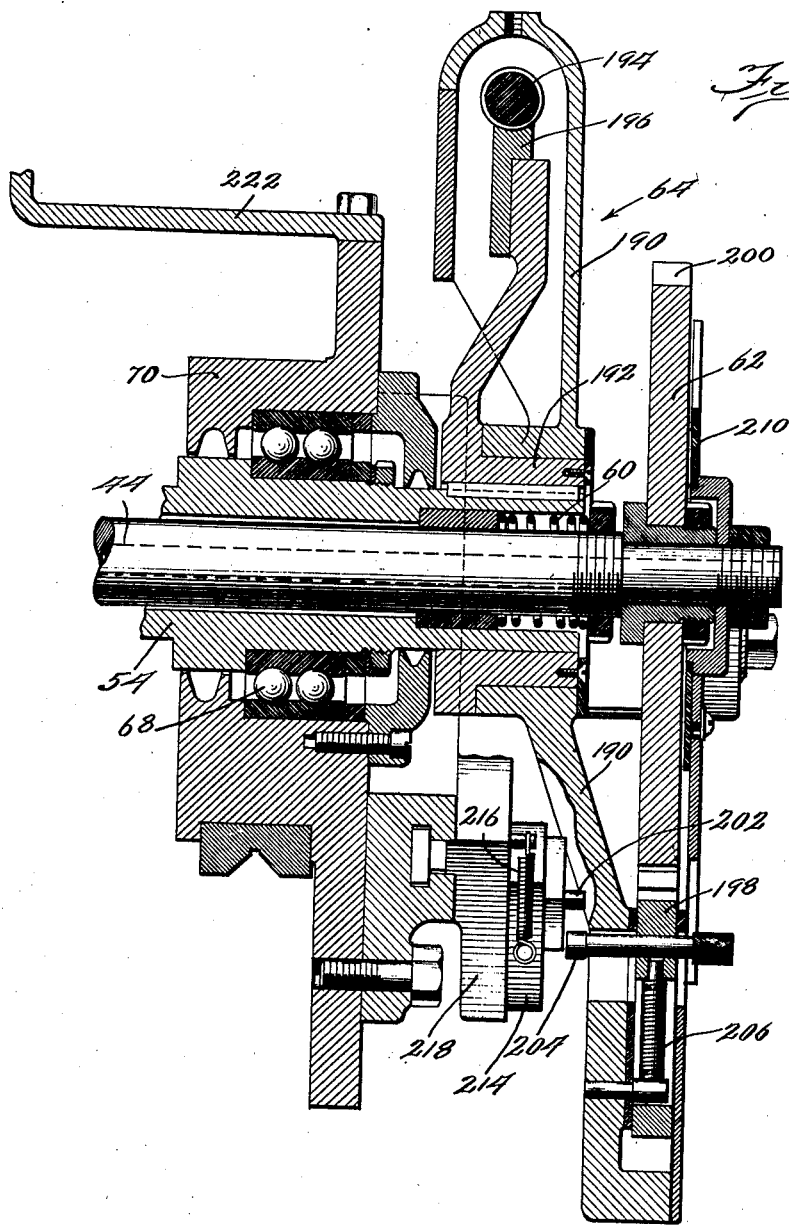

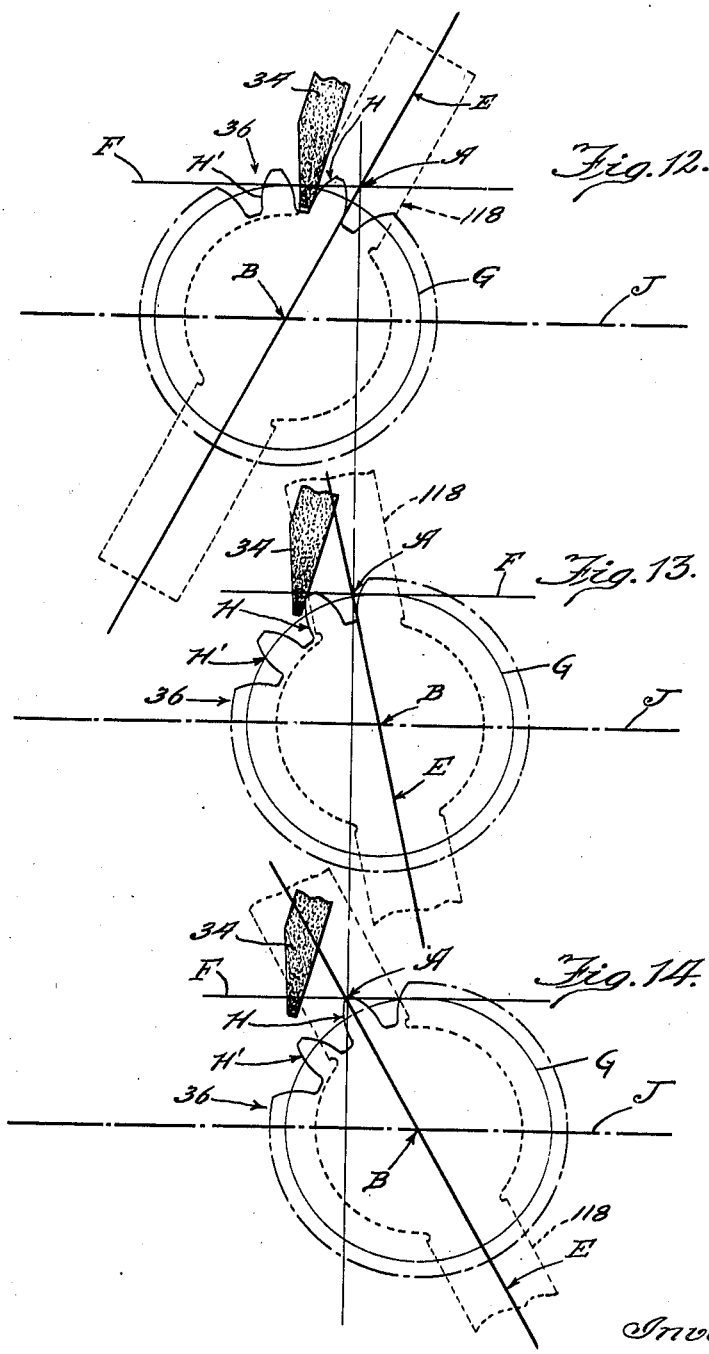

Oct. 24, 1939.     C. G. OLSON     2,176,924
GEAR GRINDING MACHINE
Original Filed Sept. 26, 1930     11 Sheets-Sheet 11

Inventor:
Carl G. Olson
By Cheever, Cox & Moore
Att'ys

Patented Oct. 24, 1939

2,176,924

UNITED STATES PATENT OFFICE 2,176,924

GEAR GRINDING MACHINE

Carl G. Olson, Chicago, Ill., assignor to Illinois Tool Works, Chicago, Ill., a corporation of Illinois Application September 26, 1930, Serial No. 484,493
Renewed February 10, 1936

9 Claims. (Cl. 51—123)

My invention relates to methods of and apparatus for grinding the contours of gear teeth, and particularly to apparatus for grinding the involute curved surfaces of gear teeth, gear shaper cutters, and the like.

It has heretofore been the practice in certain instances to grind the involute surfaces of gear teeth by applying a grinding wheel to said gear teeth and then causing the gear to roll upon a circle corresponding to the generating circle thereof. To accomplish this means have been employed such as rollers equipped with flexible bands, and these rollers correspond in diameter to the diameter of the generating circle of the gear to be ground. In other words, in grinding the gear teeth by these conventional methods, it is essential to employ a roller corresponding to the particular diameter of the generating circle of the gear, and if a gear having a different generating circle is to be ground, it is necessary to remove the first roller and substitute another one in its place. Such an arrangement obviously requires the expenditure of considerable time and effort by an operator in setting up the grinding machine for each job. Other types of conventional gear grinding machines have been employed which also require considerable effort, skill, and time in setting up and completing the grinding operation upon a gear.

It is one of the primary objects of my invention to provide methods and means for practicing same, whereby the above mentioned and other difficulties and disadvantages, which have been experienced heretofore, may be obviated, and in accordance with this object I propose to provide a machine of improved, practical construction which is adapted to accurately grind the involute curves of gear teeth in a very expeditious manner.

More specifically, it is an object of my invention to provide an apparatus, in which various sizes of gears may be ground without the necessity of the removal or addition of any machine elements, and to this end I propose to provide a machine which may be very quickly and easily adjusted to accommodate gears of various sizes.

A still further object of my invention is to provide a machine of improved, rigid, and durable construction, whereby the molding generating principle of grinding gear teeth may be practiced, that is, by rolling the gear blank along a plane tangent to its generating circle in a very expeditious manner.

Another object of my invention is to provide a machine, as above set forth, in which the gear blank may be rolled along a horizontal plane tangent to the generating circle, and the teeth thereof ground by a grinding wheel which is mounted in a fixed angular position; that is to say, which need not be adjusted for gears having different pressure angles.

Still another object is to provide a machine which is compactly arranged, and to this end I propose to mount a gear supporting spindle in such a manner that the same may be shifted with respect to a pivotal point spaced from the axis of the spindle, whereby said spindle will experience a lateral linear movement and also a rotary movement, means being provided for adjusting the distance between the axis of the spindle and the axis with respect to which said spindle is shifted.

Still more specifically, it is an object of my invention to provide a shiftable gear supporting spindle arrangement, as above set forth, in which the spindle is housed within a sleeve, said sleeve being rotatable through the agency of an arm extending radially of said sleeve and keyed thereto, and an extensible oscillatory lever mechanism swingable about an axis spaced from the spindle axis for imparting lateral linear movement to said spindle and sleeve, means being provided for accurately adjusting the distance between the axis of oscillation of the extensible lever mechanism and the axis of said spindle, said distance corresponding to the radius of the generating circle of the gear to be ground.

A further object of my invention is to provide in combination with a machine, as above set forth, an improved, practical indexing mechanism, whereby the teeth of a gear blank may be effectively and automatically indexed into position for grinding.

Another object of my invention is to provide a gear grinding machine, as above set forth, which operates on the molding generating principle and is provided with a gear blank supporting spindle, which is supported or housed within an oscillatory control lever mechanism, said mechanism serving to simultaneously impart linear and rotary movement to the gear blank.

In addition to the above mentioned advantageous structural characteristics, my invention also contemplates the provision of other improved structural features and advantages, which will be more apparent from the following detailed description when considered in connection with the accompanying drawings, wherein—

Figure 1 is a front elevational view of a machine which is representative of one embodiment of my invention, and whereby my improved method of grinding gear teeth may be effectively practiced;

Figure 2 is another elevational view of the machine as viewed from the left of Figure 1;

Figure 3 is a fragmentary vertical sectional view of the machine taken substantially along the line 3—3 of Figure 2;

Figure 4 is a vertical sectional view taken substantially along the line 4—4 of Figure 3, the housing for the spindle carriage being removed for the purpose of more clearly illustrating the other structural features;

Figure 6 is an elevational view, shown partly in section, of the grinder head, said view being taken substantially along the line 6—6 of Figure 1;

Figure 7 is a sectional view of said grinder head taken along the line 7—7 of Figure 6;

Figure 8 is a detailed sectional view of the upper portion of the machine taken along the line 8—8 of Figure 2;

Figure 9 is a fragmentary perspective view disclosing portions of the mechanism which control the movement of the gear supporting spindle;

Figure 10 is an enlarged sectional view of the indexing mechanism similar to that shown in Figure 3;

Figure 15:
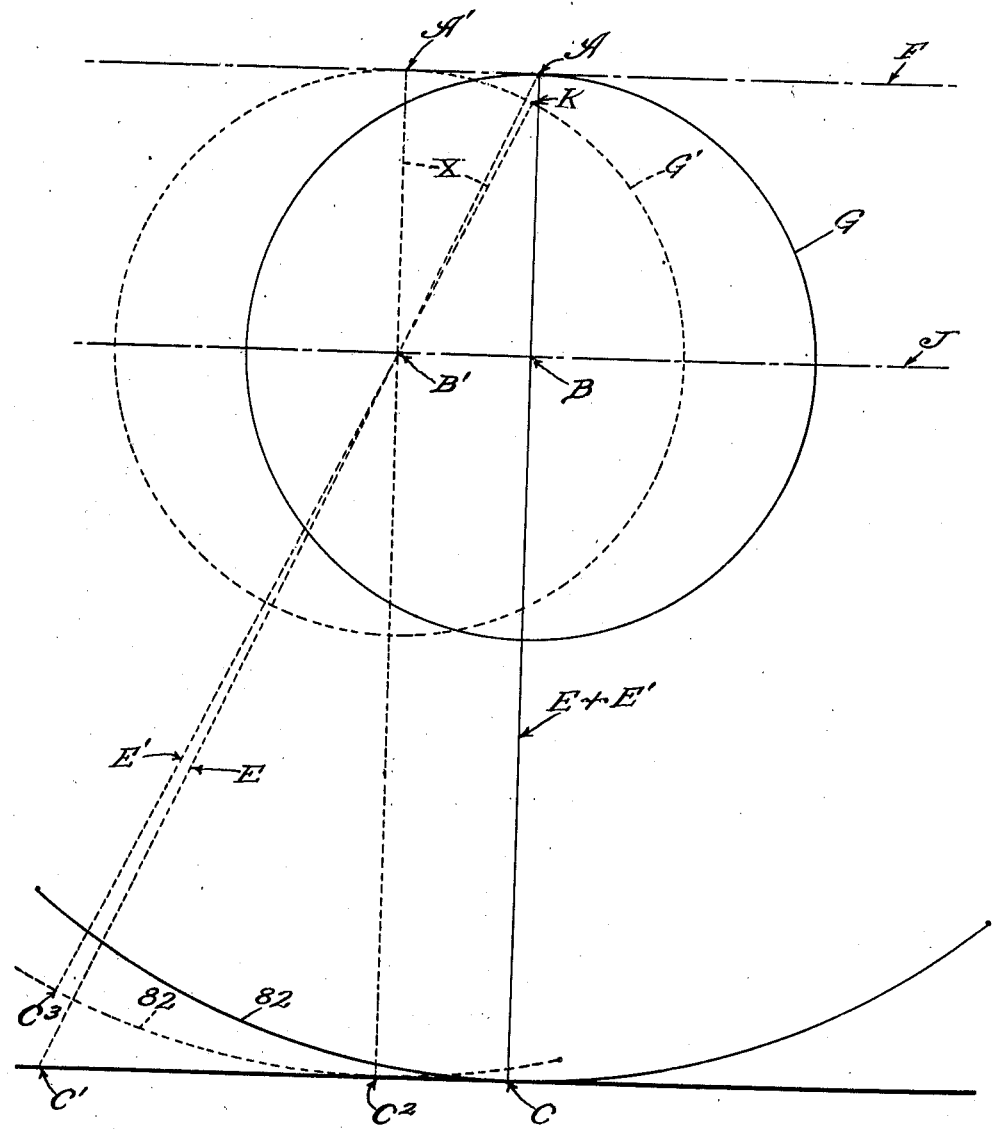

Figures 12 to 14 inclusive disclose diagrammatically successive positions occupied by the gear blank during the shifting of the spindle control mechanism, Figure 12 disclosing one extreme shifted position of the gear blank, Figure 13 disclosing the position to which the gear blank has been rolled during the grinding of one of the involute surfaces, and Figure 14 disclosing the position occupied by the gear when it has been indexed to the opposite extreme position without experiencing any rotation;

Figure 15 is a geometric diagram disclosing the principle of operation of my improved grinding machine; and Figure 16 is a horizontal sectional view taken along the line 16—16 (Fig. 1) disclosing the manner in which the column is swivelly mounted upon the carriage.

Referring now to the drawings more in detail, wherein like numerals have been employed to designate similar parts throughout the various figures, it will be noted that, in accordance with one embodiment of my invention, I propose to provide a grinding machine in which a gear supporting spindle is mounted upon a carriage which is horizontally reciprocable upon a suitable bed. The spindle is housed within a sleeve which extends over substantially its entire length, and this sleeve has a keyed connection with an arm or segment which extends downwardly and radially thereof. The lower arcuate surface of this segment is connected to a horizontally reciprocable slide by means of flexible bands, and this slide is also pivotally connected with the lower portion of an extensible lever arm which is pivoted at its upper end about an axis positioned above the axis of the spindle. This extensible lever arm is coupled with the sleeve so as to impart horizontal reciprocation to said sleeve and the spindle supported therein when said lever arm is oscillated about its axis in response to the reciprocation of the slide connected therewith. Thus it might be stated that the oscillation of the extensible lever arm causes horizontal reciprocation of the spindle and sleeve, while the oscillation of the segment serves to impart rotation to the sleeve and spindle when said parts are coupled together. While the lever arm actually oscillates about an axis spaced above the axis of the spindle, and the segment actually oscillates about the axis of the spindle, these parts are so arranged that during their oscillation they continually remain in substantial radial parallelism. By having the distance between the axis of the spindle and the axis of oscillation of the extensible lever arm equal to the radius of the generating circle of the gear to be ground, I am able to cause said gear to roll upon its generating circle. I employ a new and improved indexing mechanism which serves to control the coupling and uncoupling of the sleeve and spindle, whereby to cause said parts to rotate in unison, while the gear blank is being ground and to automatically disconnect said sleeve and spindle during a predetermined interval upon the completion of a grinding operation, and thereby permit the gear blank to experience a linear movement without rotation for the purpose of presenting the next adjacent tooth in position for grinding. The axis of the grinder wheel is inclined from the horizontal, and this angle of inclination is constant regardless of the pressure angle of the gear to be ground. To compensate for such variations, I provide conveniently operable means for adjusting the distance between the axis of the spindle and the axis of oscillation of the extensible lever arm. Therefore, in my machine the inclination of the grinder wheel with respect to the plane of reciprocation of the sleeve and spindle supporting carriage remains the same regardless of the pressure angle of the gear to be ground. I provide a suitable speed reducing mechanism coupled with a prime mover such as an electric motor for imparting reciprocation to the slide which is connected to the extensible lever arm and the segment.

Having given the foregoing general description of the machine shown in the accompanying drawings, I shall now proceed to describe the structure and operation thereof in detail. This machine includes a suitable base 20 which serves as a support for an upright frame or column designated generally by the numeral 22, as well as a support for the gear supporting and shifting mechanism which I have designated generally by the numeral 24. The upright frame or column 22 is mounted upon a slide 26, Figures 1 and 2, and this slide is mounted in suitable ways provided along the upper surface of the base 20. A hand wheel 28, connected at the outer end of a conventional screw 30, serves when rotated to adjust the position of the column 22 to the left or right of Figure 1. The purpose for this adjustment will be more apparent as the description progresses. The upper portion of the column 22 supports a grinder head designated generally by the numeral 32, and at this point in the description it will suffice to say that the grinder head carries a grinder wheel 34, Figures 2, 6 and 9, the axis of which is slightly inclined from the horizontal plane. The specific arrangement of the grinder head 32 and its associated parts will be later described in more detail. The lower portion of the marginal surface of the grinder wheel 34 is adapted to be positioned adjacent the involute surfaces of a gear blank, as for example, the gear blank 36 shown in Figure 1. The column 22 is adapted to be swiveled upon the carriage 26 when bolts 37, Figures 1, 2, and 16, are loosened. By swiveling the column 22, the grinder wheel 34 may be adjusted to enable the grinding of side clearance in the teeth of the gear blank 36.

*Spindle and sleeve supporting mechanism*

Bearing in mind that the grinder wheel 34 is positioned substantially as shown in Figure 2, I shall now proceed to describe the mechanism which supports and shifts the gear blank 36 so as to effect the grinding of the involute surfaces of said gear blank. The gear blank 36 is mounted upon a suitable arbor 38, Figure 1, and this arbor is supported at one extremity within the dead center of a tail stock 40. The opposite extremity of the arbor 38 may be mounted within a live center piece 42, which is secured within the inner extremity of a suitable spindle 44, Figures 1 and 3. The arbor 38 carries a dog 46 which is coupled with a suitable face plate 48 mounted upon the threaded portion 50, Figure 3, of the work supporting spindle 44. Thus any rotation or shifting of the spindle 44 will be imparted to the gear blank 36. The spindle 44 is formed at one extremity with an enlarged tapered head 52 which is mounted within a companion tapered bearing surface formed at the inner extremity of an oscillatory sleeve 54 which extends over and encloses substantially the entire cylindrical section of the spindle 44. The outer portion of the spindle 44 is mounted within a suitable bushing 56, which is in turn mounted within the oscillatory sleeve 54. Interposed between this bushing or collar 56 and a second collar 58 mounted on a threaded portion of the spindle 44, is a coiled spring 60, Figure 3, and this spring serves to urge the spindle to the right so as to maintain bearing contact between the tapered head 52 thereof and the complementary tapered section of the sleeve 54. The extreme outer portion of the spindle 54 is reduced to support an indexing plate 62, which forms a part of an indexing mechanism 64, later to be described.

The oscillatory sleeve 54 is rotatably mounted at one extremity within a bushing 66, Figure 3, and the opposite end of the sleeve is rotatably mounted within an antifriction bearing 68. The bushing 66 and the antifriction bearing 68 are mounted within a carriage 70, and this carriage is horizontally reciprocable upon suitable antifriction slide bearings 72 and 74 which are in turn supported along the upper portion of an auxiliary base 76. This base 76 is mounted in a fixed position by means of bolts 78 upon the main base 20, and thus it will be apparent that the carriage 70, together with the spindle 44 and the sleeve 54, are adapted to be horizontally reciprocated along the auxiliary base 76. It will be apparent that if the grinder wheel 34 is properly positioned with respect to the involute surface of one of the teeth of the gear blank 36, and said gear blank is rolled along a plane which is tangent to the generating circle of said blank, the point of contact between the grinder wheel and the gear tooth will always be positioned along the involute surface of said tooth, provided the rolling action takes place within predetermined limits.

*Mechanism for controlling spindle and sleeve*

I shall now endeavor to describe the control mechanism connected with the sleeve 54, which causes the gear blank 36 supported by the spindle 44 to be rolled along a horizontal plane tangent to the generating circle of the gear blank. An arm 80 is keyed to the sleeve 54, as clearly shown in Figure 3, and extends radially and downwardly therefrom, the lower section of said arm being formed with an arcuate section 82. This arm and arcuate section 82 will be referred to hereinafter as a segment, and this segment is adapted to be oscillated through the agency of a horizontally reciprocable slide 84, Figures 3 and 9, said slide being connected with said segment by means of suitable flexible bands 86. One extremity of each of these bands 86 is secured to the slide 84 by means of clamps 88, while the opposite extremities of said bands are secured to the arcuate section 82 of the segment by similar clamps 90. A pin 92, Figure 3, is carried by the slide 84 and serves to connect said slide with an anti-friction bearing 94 carried by a slide bar 96. Particular attention is directed to the fact that the axis of this pin 92 is substantially coincident with a horizontal plane tangent to the arcuate surface of the section 82.

This slide bar 96 forms a part of a lever mechanism which includes a main lever arm or plate 98, and this arm 98 is secured at its upper extremity through the agency of bolts 100 to a disk 102. This disk 102 has an aperture 104 to provide clearance for the sleeve 54 and the spindle 44, which extend therethrough. Said disk is mounted upon three equally spaced antifriction bearings 106, which are supported by a vertically adjustable plate 108. The uppermost roller 106 is carried upon a block 110, which is slidably mounted medially and at the upper end of the plate 108, Figures 3 and 9. The plate 108 is provided with an aperture 112 which is positioned adjacent the aperture 104 of the disk 102 and provides clearance for the sleeve 54. The axis about which the disk rotates is designated by the letter A, Figures 4 and 5, while the axis of the spindle is designated by the letter B.

Figure 5:
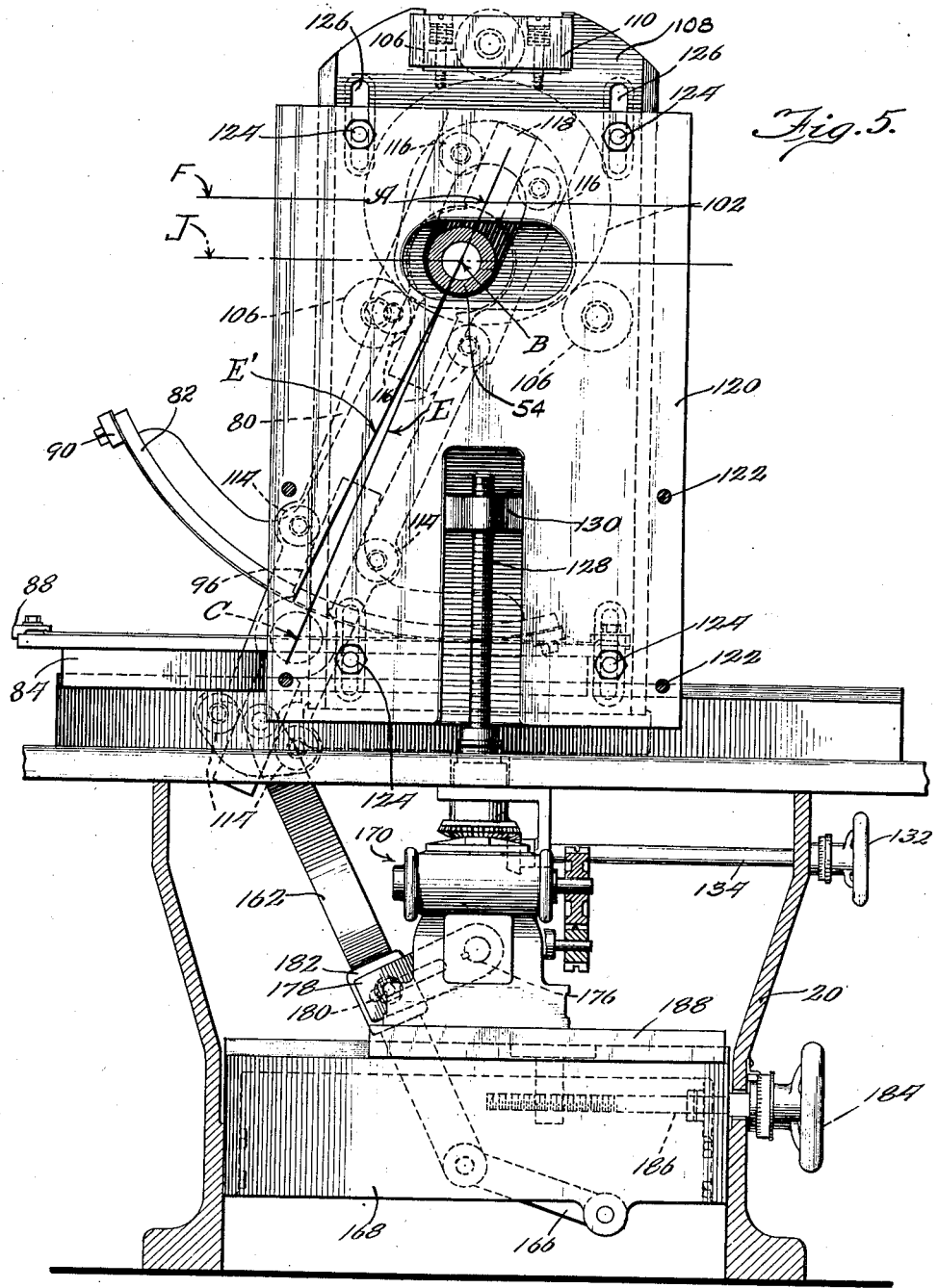
Figure 5 is a view similar to Figure 4, disclosing the spindle control mechanism in one of its extreme shifted positions.

Attention is directed to the fact that the slide bar 96 is mounted between pairs of rollers 114, Figures 4, 5, and 9, while the upper portion of the lever 98 carries a plurality of similar rollers 116, between which is mounted a second slide bar 118. This slide bar 118 is provided with an enlarged central section 118a which is mounted upon and freely rotatable with respect to the sleeve 54. The reason for this construction will be more apparent when reference is made to Figures 4 and 5. In Figure 4 the lever arm 98 and its associated slide bars 96 and 118 are shown in a substantially vertical position. When this arm 98 is shifted to another position in response to the actuation of the slide 84, as for example, when it is shifted to the left position shown in Figure 5, the distance between the axis A and the axis B will increase, Figures 3, 4, and 5, and Figures 12 to 14 inclusive. Hence the relative movement between the lever arm 98 and the bar 118 compensates for this increase in distance between these axes. Likewise, the distance between the axis A and the axis of the pin 92, which I have designated by the letter C, will also increase as said arm is swung to the left or right of the center, and the relative movement between the bar 96 and the arm 98 serves to compensate for this increase in the distance between the fixed axis of oscillation A and the axis C of the pin 92.

From the foregoing it is apparent that if the distance between the axis A and the axis B measured along a vertical line is equal to the radius of the generating circle of the gear blank 36, said gear blank will roll along the horizontal plane tangent to this generating circle as the control lever 98 and its associated parts are oscillated about the axis A, provided that the spindle 44 rotates in unison with the sleeve 54. The indexing mechanism 64, later to be described, provides the coupling between the spindle and sleeve. In the drawings I have shown the axis A positioned at its maximum distance from the axis B, but this distance may be reduced by means of mechanism about to be described.

Means for adjusting axis of oscillation

It should be noted that the plate 108 is dovetailed within an anchor plate 120, which anchor plate is secured in a fixed position to the auxiliary base 76 by means of bolts 122, Figure 5. If bolts 124 which extend through the anchor plate 120 into slots 126 provided in the plate 108, are loosened, the plate 108 may be shifted vertically within the anchor plate 120. The vertical shifting of the plate 108 is accomplished through the agency of a screw 128, which extends into a threaded block 130 carried by the plate 108, Figures 3 and 5. Rotation is imparted to the screw 128 by means of a hand wheel 132, Figures 1, 2, and 5. This hand wheel is mounted upon a shaft 134 which is connected to the screw 128 through suitable bevel gears, as clearly shown in the above figures. Thus, if it is desirable to change the vertical distance between the axes A and B, as shown in Figure 4, it is only necessary to loosen the lock bolts 124 and then manipulate the hand wheel 132. The aperture 104 in the disk 102 and the aperture 112 in the plate 108, as well as an aperture 136 in the lever arm 98, provide clearance to permit these parts to be raised and lowered in response to the actuation of the hand wheel 132.

Grinder head

The grinder head 32 includes a slide 138 which carries a grinder spindle 140, upon which the grinder wheel 34 is mounted. Rotation may be imparted to the spindle 140 from any suitable source (not shown) which may be connected to a spindle pulley 141, Figure 2. In order to effect axial adjustment of the grinder wheel 34, I provide a hand wheel 142 which is mounted on the upper extremity of a shaft 144. This shaft is mounted at its upper end in a bracket 146, Figure 7, which is mounted on a vertically adjustable slide 148. The lower extremity of this shaft supports a worm 150, which meshes with a worm wheel 152, and this worm wheel 152 is threaded to receive a complementary threaded shaft 153, which is connected with an upwardly extending bracket of the slide 138. Thus when rotation is imparted to the hand wheel 142, axial movement is experienced by the grinder wheel 34. Vertical adjustment of the grinder wheel is accomplished by means of a hand wheel 154, Figures 1 and 8. This hand wheel 154 is mounted on a shaft 156, which has a bevel gear connection with a vertical shaft 158. The lower end of this shaft 158 is threaded and supports a bracket 160, which carries the slide 148. Thus when rotation is imparted to the hand wheel 154, the screw shaft 158 rotates within the bracket 160, thereby imparting vertical movement to the grinder wheel 34. It should be noted that the inclination of the grinder wheel 34 with respect to the horizontal plane of reciprocation of the carriage 70 always remain the same, and that the only adjustment to which the grinding wheel may be subjected is a vertical or axial adjustment. In other words, the inclination of the grinder wheel is not varied to accommodate gears having different pressure angles, this variation being compensated for by the adjustment which is accomplished when the above described control mechanism, including the lever arm 98 and its associated parts, is adjusted to vary the distance between the axis of oscillation A and the spindle axis B.

Driving mechanism

Reciprocation is imparted to the slide 84 by means of a rocker arm 162, Figures 3, 4, 5, and 9. The upper end of this rocker arm 162 is pivotally connected to a bracket 164 positioned on the underside of the slide 84, while the lower extremity of the arm 162 is pivotally supported at the free end of an arm 166. This arm 166 is mounted upon a sub-frame 168 which serves as a support for a conventional gear reducing mechanism 170, which is coupled with a suitable electric motor 172, Figures 1, 4, and 5 through the agency of a roller chain 174. A drive shaft 176 of the speed reducing mechanism 170 carries an arm 178, which makes a slotted connection with a pin 180 carried within a block 182, Figures 4 and 5, which block is adapted to be adjustably positioned along the rocker arm 162. Thus, when the shaft 176 rotates, the arm 178 mounted thereon also rotates, and this causes the arm 162 to be oscillated so as to impart reciprocation to the slide 84. By adjusting the pin 180 in the slot of the arm 178, the stroke of the rocker arm may be varied, and by adjusting a hand wheel 184, which is mounted upon a screw 186, Figure 5, the motor and gear reducing mechanism may be shifted with respect to the sub-frame 168, said elements being mounted upon a suitable slide 188, which is adapted to be shifted along the upper surface of the sub-frame 168. By this adjustment the degree of movement of the slide 84 on opposite sides of the center line of the machine may be varied. In other words, if the gear reducer and motor are shifted slightly to the right, the distance through which the slide 84 travels on the right of the center line of the machine will be greater than the distance to which it moves on the left of said line.

Description of operation

Figure 11:
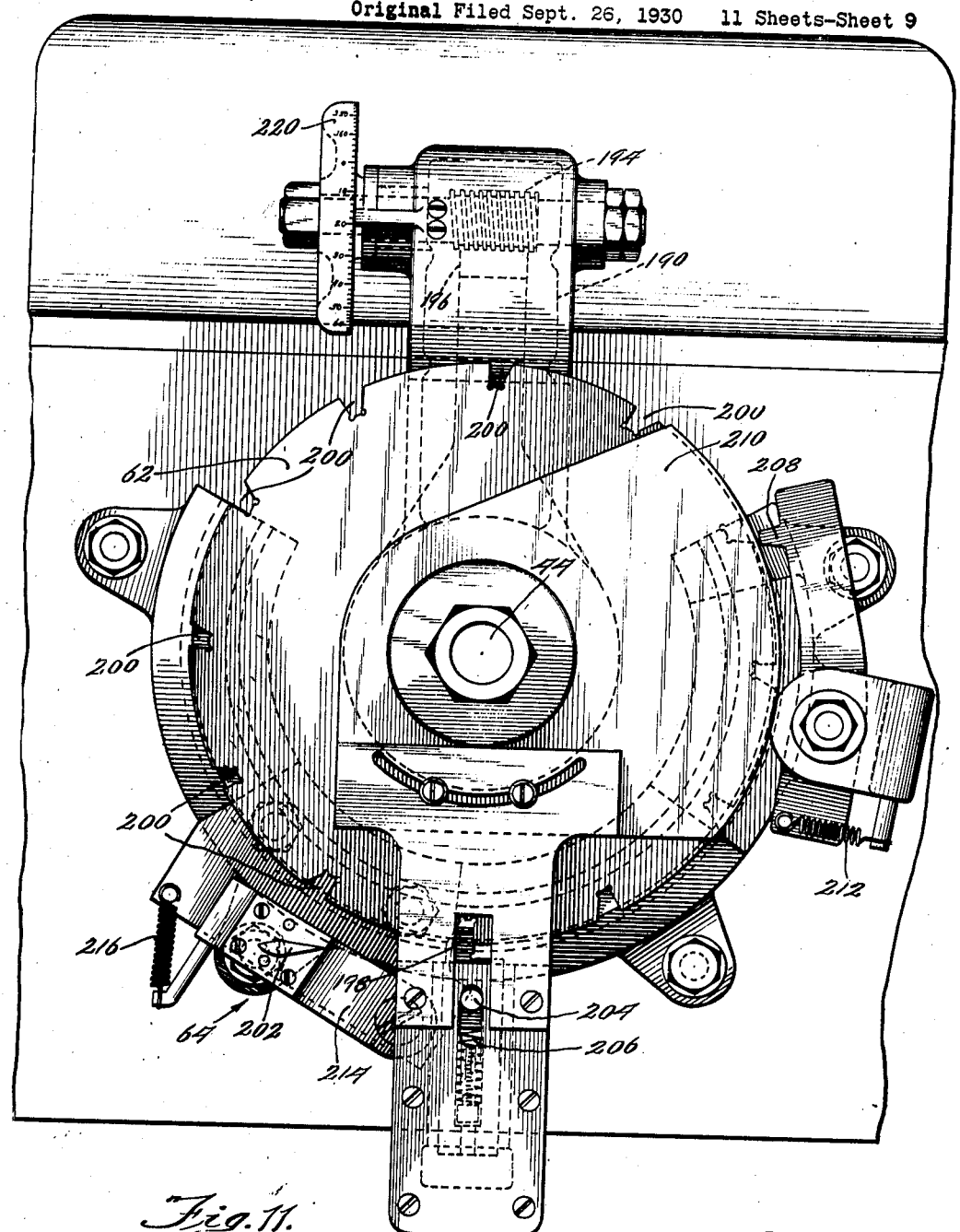
Figure 11 is an elevational view of said indexing mechanism as viewed from the right of Figure 10.

The function and structure of the indexing mechanism 64 will be more apparent if described in connection with the operation of the other machine elements, and therefore I shall now proceed to set forth a detailed description of the operation of said machine. In this connection specific reference is made to Figures 12 to 14, wherein I have in a diagrammatic way set forth the relationship between the grinder wheel and the teeth of the gear blank during one complete oscillation of the actuating segment and the associated control elements. Consider that the grinder wheel 34 is rotating and occupies the position shown in Figure 12, and that the segment, as well as the control lever 98, have been swung to the extreme left position as indicated by the heavy line E shown in Figure 12. This line E obviously passes through the axis of oscillation A, as well as the axis B of the spindle 44. For purposes of illustration I have designated the slide bar 118 by dotted lines in Figures 12 to 14 inclusive. If the slide 84 begins to move to the right from the position shown in Figure 5 and which is designated by the heavy line E in Figures 5 and 12, the gear blank 36 will be rotated in a counter-clockwise direction provided that the sleeve 54 is coupled with the spindle 44. The coupling of these parts is established through the indexing mechanism 64, which includes a yoke 190, Figures 3, 10, and 11, which is mounted upon and adapted to be rotatably shifted with respect to a bushing 192, and this bushing 192 is keyed to the outer end of the sleeve 54. Positive connection between the yoke 190 and the bushing member 192 is established through the agency of a worm 194, Figures 10 and 11, which is carried by the yoke 190 and a companion worm gear segment 196, which is supported by an upwardly extending arm of the bushing 192. The yoke 190 carries a pawl 198, which is adapted to be received by one of a plurality of notches 200 provided in the indexing disk 62. When the pawl 198 occupies the position shown in Figure 11, positive driving connection is established between the sleeve 54 and the spindle 44. Consider now that the elements of the indexing mechanism 64 occupy the relative positions shown in Figures 10 and 11, and that the control lever arm 98 is beginning its movement from the position indicated by the line E in Figure 12 to the position shown in Figure 13. During this movement the pawl 198, together with the yoke and indexing disk, will be moved in a clockwise direction as viewed in Figure 11. This will cause the gear blank 36 to be rolled along a line or plane F, Figures 12 and 13, which is tangent to a circle G which designates the generating circle of the gear. During this movement of the machine elements the grinder wheel 34 will operatively engage the involute surface H, and when the gear blank has been shifted to the position shown in Figure 13, the grinding operation along the surface H will be completed. At about this point a cam 202, Figures 10 and 11, is engaged by a pin 204 mounted within the pawl 198, and causes said pin to be urged outwardly against the action of a coiled spring 206. This causes the pawl 198 to be disengaged from its companion notch 200, thereby causing the driving connection between the spindle 44 and the sleeve 54 to be broken. In other words, continued movement of the yoke 190 to the left, after the pawl 198 has become disengaged from its companion disk notch, will not impart rotation to the spindle 44, but the sleeve 54, which carries the spindle, will continue to move so as to carry the axis B of the spindle from the position shown in Figure 13 to the position shown in Figure 14. During this movement the gear blank will not rotate, but will be moved in a linear direction without rotation. In order to positively prevent any rotation from being imparted to the indexing disk 62 and consequently to the spindle 44, when the pawl 198 is disengaged, I provide another locking pawl 208 which is pivotally mounted upon the machine frame. This pawl is adapted to ride upon the marginal surface of a plate 210, which is mounted upon and moves with the yoke 190 until the margin of said plate clears said pawl, at which time said pawl is urged into the next adjacent disk notch 200 through the agency of a coiled spring 212. The margin of the plate 210 clears the pawl 208 at the instant that the indexing pawl 198 becomes disengaged through the action of the cam 202 and the pin 204. Thus the disk is positively secured against further rotation in a clockwise direction, Figure 11, during the remaining stroke of the yoke 190. As the yoke reaches the limit of its stroke to the left, Figure 11, or what would correspond to the right, Figure 14, the pawl 198 engages another complementary notch in the disk 62. As the slide 84 begins to move in the opposite direction so as to swing the control mechanisms from the position indicated by the heavy line E, Figure 14, to the left, the disk will be rotated in a reverse direction, thereby imparting rotation to the gear blank 36 in a clockwise direction, as viewed in Figure 14, thus bringing the next involute tooth surface $H^1$ into operative association with the grinder wheel. The pawl 208 automatically disengages from its companion notch in the disk because of the inclination on one side of said pawl, and eventually the margin of the plate 210 engages said pawl so as to positively prevent any further engagement thereof during the grinding of the gear tooth. Thus, during the complete reverse movement of the yoke 190 and its associated parts, both the sleeve 54 and the spindle 44 are coupled together, thereby causing the gear blank to be rotated during its movement from the position shown in Figure 14 to the initial position shown in Figure 12. As the pin 204 carried by the pawl 198, Figure 11, is swung in a counter-clockwise direction during this reverse movement, it is moved into engagement with the inside of the cam 202, thereby causing the pivoted arm 214 upon which the cam is mounted, to be urged outwardly against the action of a coiled spring 216. In other words, the pawl 198 is not disengaged during the reverse movement, that is, during the movement in a counter-clockwise direction as viewed in Figure 11. This arm 214 which carries the cam 202, is mounted upon a suitable bracket 218, which is clearly shown in Figure 10. If it is desirable to angularly adjust the position of the yoke 190 with respect to the sleeve 54, it is only necessary to rotate a graduated hand wheel 220, Figure 11, which operates the worm 194. This causes the yoke to be shifted with respect to the bushing 192, and this bushing, as stated above, is keyed to the sleeve 54. This adjustment is made for example, when it is desired to increase the amount of stock which is to be removed by the grinder wheel. In other words, when it is desirable to vary the cutting action of the grinder wheel, it is only necessary to manually rotate the hand wheel 220.

*Geometric analysis of operation*

In order to more clearly set forth the fundamental principles of operation upon which my improved grinding machine is based, reference is made to the geometric diagram shown in Figure 15. In this diagram I have employed letters corresponding to the letters shown in Figures 12 to 14 inclusive, as well as other figures disclosing the machine structure. In order to exaggerate certain of the movements of the machine elements, I have digressed from the proportions shown in the remaining figures, that is, I have shown the diameter of the generating circle larger in proportion to the other lever elements than the diameter of the corresponding generating circle shown in the other figures.

Consider first the representation shown in the solid line of the generating circle G, the arcuate section 82, and the central vertical line which I have designated by the letters E and $E^1$. E designates the central radial line of the extensible lever mechanism, which extends from the axis of oscillation A to the axis C of the pin 92, and $E^1$ designates the central radial line of the segment. For purposes of clearness I have designated the arcuate section of the segment by the numeral 82, which corresponds to the numeral previously employed to designate the arcuate section of said segment.

Consider now that the center line E swings to the left about its axis A to the position shown by the dotted lines. During this swinging movement the axis C of the pin 92 is moved to the left to the point designated by the letter $C^1$, and the axis B of the spindle is moved to the position designated by the letter $B^1$. Thus, the axis of the spindle and consequently the axis of the supported gear blank is laterally moved along the line or plane J a distance $B$—$B^1$. From the foregoing description it will be remembered that during this linear lateral movement of the axis B, the segment 82 is imparting rotation to the gear blank. In other words, as the gear blank is being moved in a linear direction to the left, Figure 15, said blank is experiencing a predetermined degree of rotation about its axis. It will be clear that the distance $C$—$C^1$ represents the actual linear movement experienced by the pin 92, and consequently the slide 84 with which it is connected, as the line E is swung from its central vertical position to the dotted left position. This distance of travel $C$—$C^1$ is also imparted to the segment, a portion of said movement, namely, a movement equivalent to $C$—$C^2$ which is equal to the linear distance $B$—$B^1$, being absorbed by the segment in linear travel, and the remaining portion of the movement or distance, namely, the distance represented by $C^1$—$C^2$, being absorbed by the segment in rotary movement or travel. In other words, the distance $C^1$—$C^2$ measured along the arcuate line of the segment section 82, is equivalent to the distance $C^2$—$C^3$. Therefore, it will be apparent that the radial center line $E^1$ of the segment moves through a greater angular distance to the position shown by the dotted lines in Figure 15, during the above mentioned movement of the associated machine elements.

When the line $E^1$ is extended, it will intersect the shifted generating circle designated by the letter $G^1$ at the point K. A vertical line passing through the axis $B^1$ intersects the line F at $A^1$, which is the point of tangency of said line with the circle $G^1$. Thus, it may be stated that if the circle G rolls along the line F, so that the axis is shifted from the point B to the point $B^1$, this distance $B$—$B^1$ measured along said circle circumference will represent the portion of the circumference which rolls from the point A to the point $A^1$.

From the diagram shown in Figure 15 the following equation may be drawn:

$$\frac{A^1A}{C^1C^2} = \frac{A^1K}{C^3C^2}$$

Knowing that $C^1C^2$ equals $C^3C^2$, it follows that $$A^1A = A^1K$$

In other words, the arc $A^1K$ which subtends the angle of displacement X of the line $E^1$ is equal to the linear distance $A^1A$ or $B^1B$, which is the distance the axis B moves as a result of the shifting of the lever arm or line E, when said line moves from the vertical solid line position to the dotted line position.

From the foregoing description, I have proven that when the axis C is shifted horizontally to the point $C^1$, the lever arm or line E causes the center of the generating circle to move from the point B to the point $B^1$, and that during this movement said circle is rolled along the line F without slippage. Therefore, a tooth on the gear blank will follow the true involute path as it sweeps past the fixed grinder wheel, and consequently said grinder wheel will grind said surface along this path. In connection with the diagram in Figure 15, following proportions should be noted:

$$\frac{AB}{BC} = \frac{AB^1}{B^1C^1}$$

Likewise—

$$\frac{KB^1}{B^1C^3} = \frac{AB}{BC}$$

Thus, regardless of the position to which the axis of oscillation A is shifted, the leverage mechanism, including the extensible lever arm and the segment, maintains constant proportional relationship.

It may be stated that I employ magnified lever arms to attain proportionately reduced rotary and linear movements of the gear blank. That is to say, the radius represented by the distance from the spindle axis B to the arcuate surface of the segment represented by the line BC in Figure 15, is considerably greater than the radius of the generating circle upon which the gear blank rolls. Likewise, the distance through which the lower end of the lever arm must be swung, namely, the distance $CC^1$, is considerably greater than the actual linear travel which is imparted to the gear blank, namely, the distance $BB^1$. Thus, by employing magnified linear and rotary movements and proportionally reducing these movements, I am able to impart the desired rotary and linear movements to the gear blank with refined accuracy.

Summary

From the foregoing description it should be clear that the axis B of the spindle is repeatedly and laterally reciprocated along a horizontal path which is indicated by a dot-and-dash line J, Figures 12 to 14 inclusive, and that during one-half of said reciprocation the gear blank is shifted so as to effect the rolling thereof along its generating circle during the grinding operation, and then the rotation of the blank is interrupted during a further linear movement of the blank to effect the indexing thereof so as to place the next adjacent tooth in position to be ground. It should also be apparent that during the entire remaining half of the reciprocation the gear blank experiences rotation. The indexing mechanism 64 serves as a means for coupling and uncoupling the spindle 44 and the sleeve 54 at proper predetermined intervals to accomplish the above movement of the gear blank. It will also be apparent that during the combined rotary and linear movement of the gear blank, the control lever arm 98, together with its associated slide bars 96 and 118, will oscillate about the axis A which forms the center of the disk 102. Likewise, the segment which comprises the segment arm 80 and the arcuate section 82 oscillates about the axis B. Therefore it might be stated that these elements which control the movement of the gear supporting spindle oscillate about an axis spaced from the axis of the spindle, and that the vertical distance between this axis of oscillation A and the axis of the spindle B corresponds to or is equal to the radius of the generating circle G of the gear blank. When it is desired to grind a gear blank having teeth which are generated along a circle which varies in diameter from the circle G, it is only necessary to adjust the position of the axis A with respect to the spindle axis B by a simple and convenient manipulation of the hand wheel 132.

From the foregoing it will be apparent that my invention contemplates the provision of a grinding machine which is very compactly arranged and which is adapted to perform very accurate grinding operations. The rigid construction of the upright column 22 provides a very firm mounting for the grinder head, and by means of the hand wheels 154 and 142 the grinder wheel may be accurately and sensitively adjusted in an axial or vertical direction. The mechanism which includes the oscillatory segment, the lever arm 98, the slide bars 96 and 118, as well as the pivotal support therefor, provides what might be termed an oscillatory means or lever mechanism which is adapted to impart rotary movement to the work supporting spindle, as well as linear movement to said spindle. This lever mechanism is extensible in construction as will be apparent from the foregoing description relating to the lever arm 98 and its associated slidable bars 96 and 118. In other words, as the lever mechanism shifts from side to side it increases in length, due to the fact that the distance between the axis of oscillation A and the axis C constantly varies.

At this point it will be clear that, while the segment actually oscillates about the spindle axis for the purpose of imparting rotation thereto, said segment is subjected to a compound movement as a result of the fact that the spindle is contemporaneously subjected to linear movement as the result of action of the extensible lever arm, namely, the lever arm 98 and its associated slide bars 96 and 118. In fact, as the segment is oscillating about the axis of the spindle, it is contemporaneously being shifted in a linear horizontal direction. Due to the fact that the lever arm 98 is pivoted about an axis spaced above or from the axis of the spindle, the oscillatory segment actually experiences an outward and inward radial movement with respect to the axis of oscillation A as it is being oscillated. In other words, when the segment occupies its central position as shown in Figures 4 and 9, its radial disposition with respect to the axis of oscillation A is less than the radial disposition thereof when it is swung to the position shown in Figure 5. Therefore, it can be stated that the means for rotating the spindle, namely, the segment, experiences not only an oscillatory movement about its own axis, namely, the axis B, but also a superimposed radial movement with respect to the axis of oscillation A.

When the gear blank 36 has been successively indexed so as to complete one revolution thereof, said blank may be removed and supported in a, reverse direction upon the spindle and the grinding operation, described above, repeated. By having the spindle and sleeve juxta-positioned in the manner shown, and by using in combination therewith the described extensible lever mechanism, a structure of extremely practical construction is presented, and this structure is adapted to very efficiently effect accurate grinding of involute surfaces of the gear teeth. It should also be noted that the entire operating mechanism is protected by a cover or housing 222, which extends completely over the upper side of the carriage 70. This housing 222 cooperates with the carriage 70 in providing a complete enclosure for all of the parts which constitute the lever mechanism, the spindle, and the sleeve in which the spindle is mounted. By this arrangement all of the parts are insured against the accumulation of foreign matter. The indexing mechanism is of very practical construction and serves as an effective means for positively indexing the gear blank during each complete reciprocation of the main carriage 70. In Figures 12 to 14 I have endeavored to show in a schematic way the relative positions assumed by the gear blank during one-half of its complete reciprocation, and in this connection it is to be understood that the representations in these figures are not submitted as accurate developments of gear teeth, but are shown for the purpose of more clearly illustrating the general principle upon which my improved machine operates.

Having thus described my invention, what I claim as new and desire to secure by Letters Patent is:

1. In a machine for generating gears or the like, a spindle to carry the gear to be ground, said spindle being adapted to be rotated on its axis and to be shifted laterally in a plane including its axis, a lever pivoted about the axis of the spindle for rotating the spindle, a rectilinearly moving means, means connecting the spindle rotating lever to the moving means whereby the point of connection on the spindle rotating lever is moved circumferentially about the axis of the spindle a distance equal to the rectilinear distance moved by said moving means, a lever for moving said spindle laterally in such plane, said lever being pivoted on an axis on the opposite side of said plane from said rectilinearly moving means and said axis being spaced from such plane a distance equal to the radius of the generating circle of the gear, and means linking said second lever with said rectilinearly moving means whereby said second lever is maintained always in line with the same point on said rectilinearly moving means.

2. In a machine for generating gears or the like, a spindle to carry the gear to be ground, said spindle being adapted to be rotated on its axis and to be shifted laterally in a plane including its axis, a lever pivoted about the axis of the spindle for rotating the spindle, a rectilinearly reciprocating means, means connecting the spindle rotating lever to the reciprocating means whereby the point of connection on the spindle rotating lever is moved circumferentially about the axis of the spindle a distance equal to the rectilinear distance moved by said rectilinearly reciprocating means, a lever for moving said spindle laterally in such plane, said lever being pivoted on an axis on the opposite side of said plane from said rectilinearly reciprocating means and said axis being spaced from said plane a distance equal to the radius of the generating circle of the gear, and means linking said second lever with said rectilinearly reciprocating means whereby the long axis of said second lever is maintained always in line with the same point on said rectilinearly reciprocating means.

3. In a machine for generating gears or the like, a spindle to carry the gear to be ground, said spindle being adapted to be rotated on its axis and to be shifted laterally in a plane including its axis, reciprocating means moving rectilinearly in a plane spaced from said spindle axis, means pivoted about the axis of said spindle for rotating the spindle, means connecting said spindle rotating means with said reciprocating means whereby the point of connection on said spindle rotating means is moved circumferentially about the axis of said spindle a distance equal to the distance of simultaneous rectilinear movement of said reciprocating means, spindle shifting means pivoted about an axis spaced from the plane of the axis of said spindle an amount equal to the radius of the generating circle of the gear and on the side of the spindle away from said reciprocating means, said spindle shifting means passing through the plane of movement of said reciprocating means, and a linkage between said reciprocating means and said spindle shifting means, whereby to move the spindle shifting means, the point where said spindle shifting means passes through the plane of movement of said reciprocating means moving simultaneously with the reciprocating means a distance equal to the distance moved by the reciprocating means.

4. In a gear generating apparatus, a gear holding spindle adapted to be rotated and to be shifted laterally, a lever pivoted on the axis of said spindle for rotating the spindle and having a foot comprising a sector of a circle concentric with the spindle, a second lever pivoted on an axis spaced from the axis of the spindle, means for adjusting the distance between the axis of the spindle and the axis of the second lever, a rectilinearly reciprocating slide member associated with the second lever and with the foot of the first lever, means coupling the foot of the first lever with the slide member whereby the foot is moved circumferentially about the axis of the spindle a distance equal to the distance rectilinearly moved by the slide member, and means movable longitudinally of the second lever pivoting the second lever to the slide member at a fixed position on the slide member, whereby the second lever is moved simultaneously with the movement of the first lever but through a lesser angle, the radius of the generating circle of the gear being ground being equal to the distance between the plane in which the axis of the spindle moves and the axis of the second lever.

5. In apparatus for grinding gear teeth and the like, a gear supporting spindle, a first oscillatory means pivoted on the axis of said spindle for rotating said spindle a constant amount, a second, separate, oscillatory means pivoted on an axis spaced from said spindle axis for translating said spindle laterally, a reciprocating driving means, means connecting said driving means to said first oscillatory means for applying to the latter a force at a constant radial distance from the axis of the spindle, means connecting said driving means to said second oscillatory means for applying thereto a force at a radial distance from the axis of said spindle which varies and is proportional at any instant to said constant distance in the ratio of the distance between the spindle axis and the axis of oscillation of said second oscillatory means to the radius of the generating circle of the gear being ground, and adjustable supporting means for said second oscillatory means for shifting the axis of oscillation thereof to accommodate gears having generating circles of different diameters.

6. In apparatus for grinding gear teeth and the like, a shiftable support, a gear supporting spindle shiftable with said support, means for rotating the gear supporting spindle a constant amount, an oscillatory lever, a second lever loosely pivoted on the spindle, means for mounting said second lever on said oscillatory lever for rectilinear movement relative thereto whereby to move said spindle laterally upon oscillation of said oscillatory lever, and adjustable supporting means for said oscillatory lever for shifting the axis of oscillation thereof to accommodate gears having generating circles of different diameters.

7. An apparatus for grinding gear teeth and the like, a gear supporting spindle, a reciprocating driving means, means connected to said driving means for rotating the gear supporting spindle a constant amount, an oscillatory lever, a second lever loosely pivoted on the gear supporting spindle, a third lever pivotally connected to the reciprocating driving means, means for slidably mounting said second and third levers on said oscillatory lever whereby to oscillate said lever and move said spindle laterally upon reciprocation of said driving means, and adjustable supporting means for said oscillatory lever for shifting the axis of oscillation thereof to accommodate gears having generating circles of different diameters.

8. In the combination of claim 7 wherein the adjustable supporting means comprises a rectilinearly shiftable support, a plurality of annularly arranged rollers carried by said support, a disk mounted on said rollers for rotation about an axis spaced vertically from the spindle axis a distance equal to the radius of the generating circle of the gear being ground, means for fixedly securing the oscillatory lever to said disk, and means for moving the shiftable support to vary the distance between the axis of rotation of said disk and the spindle axis to accommodate gears having generating circles of different diameters.

9. In apparatus for grinding gear teeth and the like, rectilinearly operating driving means, a gear supporting spindle, a support for said spindle movable in a plane parallel to the plane of movement of said driving means, an oscillatory lever pivoted about the axis of the spindle for rotating the spindle and having a foot comprising a sector of a circle concentric with the spindle, means operably securing said circular foot to said driving means for movement thereby, a second oscillatory lever, a third lever loosely pivoted on the gear supporting spindle, a fourth lever pivotally connected to the rectilinearly operating driving means, means for slidably mounting said third and fourth levers on said second oscillatory lever whereby to oscillate said lever and move said spindle laterally upon reciprocation of said driving means and adjustable supporting means for said second oscillatory lever for shifting the axis of oscillation thereof to accommodate gears having generating circles of different diameters.

CARL G. OLSON.